United States Patent
Jacob et al.

(10) Patent No.: US 9,547,526 B2
(45) Date of Patent: *Jan. 17, 2017

(54) DISPATCHING FUNCTION CALLS ACROSS ACCELERATOR DEVICES

(71) Applicant: International Business Machines Corporation, Armonk, NY (US)

(72) Inventors: Arpith C. Jacob, Dobbs Ferry, NY (US); Olivier H. Sallenave, Baldwin Place, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,048

(22) Filed: Jun. 19, 2015

(65) Prior Publication Data

US 2016/0283264 A1    Sep. 29, 2016

Related U.S. Application Data

(63) Continuation of application No. 14/667,009, filed on Mar. 24, 2015.

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/48 | (2006.01) |
| G06F 9/54 | (2006.01) |

(52) U.S. Cl.
CPC ............. *G06F 9/485* (2013.01); *G06F 9/54* (2013.01)

(58) Field of Classification Search
CPC ...................................................... G06F 9/547
USPC ................................................... 719/320
See application file for complete search history.

(56) References Cited

U.S. PATENT DOCUMENTS

| 6,470,380 B1 * | 10/2002 | Yoshizawa | G06F 9/5011 709/213 |
| 2005/0138638 A1 * | 6/2005 | Pilkington | G06F 9/465 719/316 |

OTHER PUBLICATIONS

Arpith C. Jacob, et al., "Dispatching Function Calls Across Accelerator Devices", U.S. Appl. No. 14/667,009, filed Mar. 24, 2015.

(Continued)

*Primary Examiner* — Timothy A Mudrick
(74) *Attorney, Agent, or Firm* — Cantor Colburn LLP

(57) ABSTRACT

In one embodiment, a computer-implemented method for dispatching a function call includes receiving, at a supervisor processing element (PE) and from an origin PE, an identifier of a target device, a stack frame of the origin PE, and an address of a function called from the origin PE. The supervisor PE allocates a target PE of the target device. The supervisor PE copies the stack frame of the origin PE to a new stack frame on a call stack of the target PE. The supervisor PE instructs the target PE to execute the function. The supervisor PE receives a notification that execution of the function is complete. The supervisor PE copies the stack frame of the target PE to the stack frame of the origin PE. The supervisor PE releases the target PE of the target device. The supervisor PE instructs the origin PE to resume execution of the program.

6 Claims, 5 Drawing Sheets

(56) References Cited

OTHER PUBLICATIONS

List of IBM Patents or Patent Applications Treated as Related; (Appendix P), Filed Aug. 23, 2015; 2 pages.

* cited by examiner

DISPATCHING FUNCTION CALLS ACROSS ACCELERATOR DEVICES

DOMESTIC PRIORITY

This application is a continuation of U.S. patent application Ser. No. 14/667,009, filed Mar. 24, 2015, the disclosure of which is incorporated by reference herein in its entirety.

STATEMENT REGARDING FEDERALLY SPONSORED RESEARCH OR DEVELOPMENT

This invention was made with Government support under B599858 awarded by Department of Energy. The Government has certain rights to this invention.

BACKGROUND

Various embodiments of this disclosure relate to dispatching function calls in a computer system and, more particularly, to dispatching function calls across devices.

During execution of a program, one or multiple function calls may be made. Function calls alter a program state by switching execution context and allocating frames on a dedicated stack, usually referred to as "call stack."

Generally, when a function is called during execution of a program, parameters of the call are saved onto a current stack frame, a program counter is saved into a link register, and the program branches to the address corresponding to the called function's code. The called function then allocates a stack frame on top of the previous stack frame and uses the new stack frame as its execution context. The called function accesses its parameters from the stack frame of the caller. When the called function returns, the return value is saved onto the stack frame of the caller. The called function's stack frame is removed, and the program branches to the address contained in the link register. The caller accesses the return value from its own stack frame.

SUMMARY

In one embodiment of this disclosure, a computer-implemented method for dispatching a function call includes receiving, at a supervisor processing element (PE) and from an origin PE, an identifier of a target device, a stack frame of the origin PE, and an address of a function called from the origin PE. The supervisor PE allocates a target PE of the target device. The supervisor PE copies the stack frame of the origin PE to a new stack frame on a call stack of the target PE. The supervisor PE instructs the target PE to execute the function at the address. The supervisor PE receives a notification from the target PE that execution of the function is complete. The supervisor PE copies the stack frame of the target PE to the stack frame of the origin PE. The supervisor PE releases the target PE of the target device. The supervisor PE instructs the origin PE to resume execution of the program.

In another embodiment, a system includes a memory having computer readable instructions and one or more processors for executing the computer readable instructions. The computer readable instructions include receiving, at a supervisor PE and from an origin PE, an identifier of a target device, a stack frame of the origin PE, and an address of a function called from the origin PE. Further according to the computer readable instructions, the supervisor PE allocates a target PE of the target device. The supervisor PE copies the stack frame of the origin PE to a new stack frame on a call stack of the target PE. The supervisor PE instructs the target PE to execute the function at the address. The supervisor PE receives a notification from the target PE that execution of the function is complete. The supervisor PE copies the stack frame of the target PE to the stack frame of the origin PE. The supervisor PE releases the target PE of the target device. The supervisor PE instructs the origin PE to resume execution of the program.

In yet another embodiment, a computer program product for dispatching a function call includes a computer readable storage medium having program instructions embodied therewith. The program instructions are executable by a processor to cause the processor to perform a method. The method includes receiving, at a supervisor PE and from an origin PE, an identifier of a target device, a stack frame of the origin PE, and an address of a function called from the origin PE. Further according to the method, the supervisor PE allocates a target PE of the target device. The supervisor PE copies the stack frame of the origin PE to a new stack frame on a call stack of the target PE. The supervisor PE instructs the target PE to execute the function at the address. The supervisor PE receives a notification from the target PE that execution of the function is complete. The supervisor PE copies the stack frame of the target PE to the stack frame of the origin PE. The supervisor PE releases the target PE of the target device. The supervisor PE instructs the origin PE to resume execution of the program.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are dispatch systems, methods, and program products that enable direct invocation of function calls across processing elements (PEs) and devices in a system with a host processor and one or more devices. When a function call is dispatched from one PE to another, or from one accelerator device to another, non-trivial modifications are required to the general handling of function calls. The situation can become even more complex when the accelerator devices involved are heterogeneous.

According to some embodiments, a supervisor PE may acquire a thread from another PE, to channel arguments and return values and to bridge a disjointed call stack between PEs. The dispatch system 100 may be initiated at compile-time. In other words, when program code is compiled, the compiler may generate assembly code configured to implement the dispatch system 100 according to this disclosure.

In conventional dispatch systems, a function call must return control to a host processor before invoking another function, such as one on a different device than a prior function. This act of returning to the host processor introduces performance degradation and code complexity. According to some embodiments, however, the dispatch system may build and communicate necessary information directly across devices, thereby eliminating the need to involve the host processor. In such embodiments, the supervisor PE that is used for cross-PE communication may be physically located on a hardware accelerator device rather than on the host processor. Communicating between devices may therefore reduce performance degradation, as compared to conventional systems.

Figure 1:
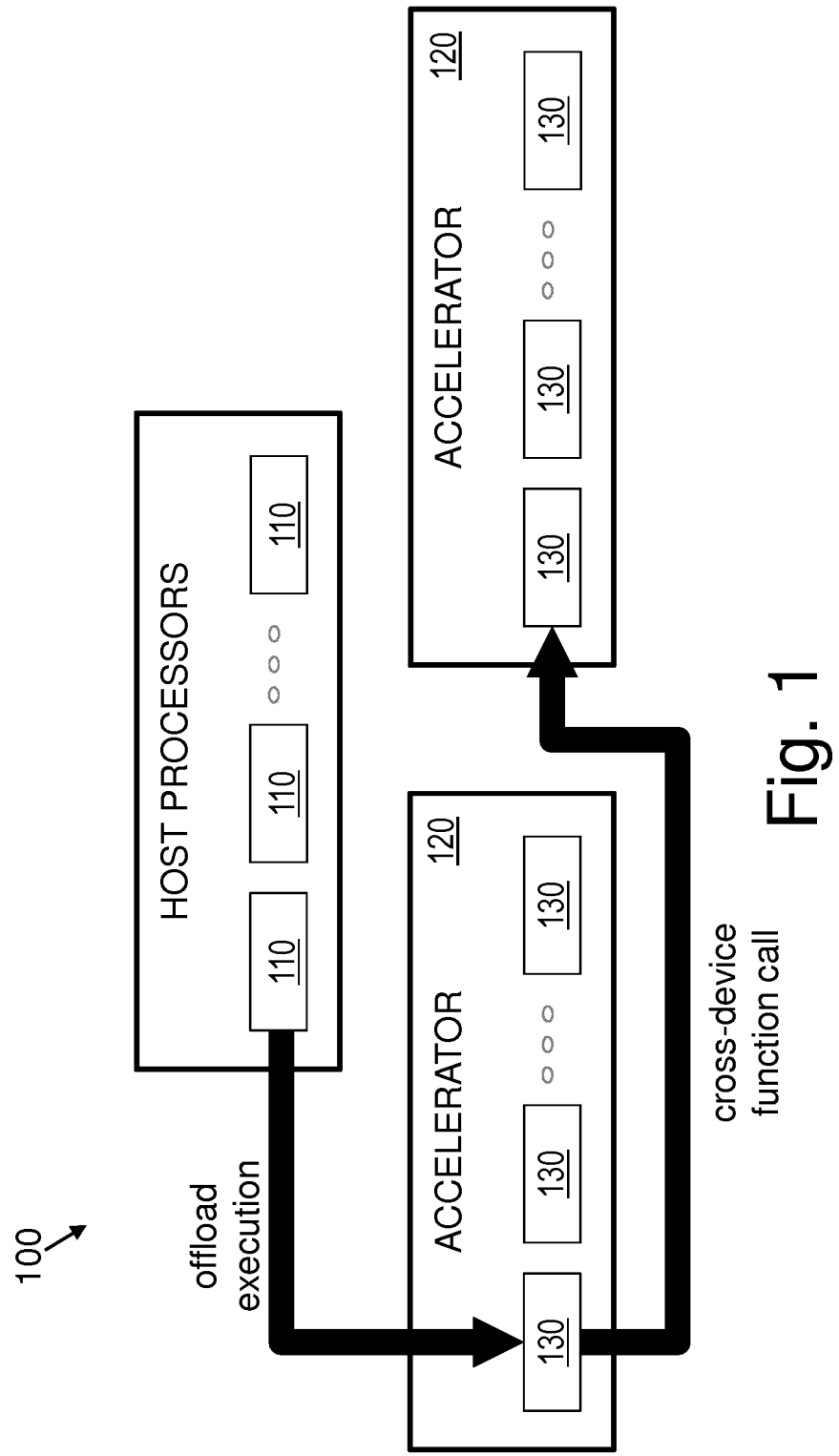
FIG. 1 is a block diagram of a dispatch system, according to some embodiments of this disclosure.

FIG. 1 is a block diagram of a dispatch system 100, according to some embodiments of this disclosure. The dispatch system 100 may be integrated, at least in part, in a computer system, and as shown, the dispatch system 100 may include at least one host processor 110 and two or more devices 120, such as accelerators or other hardware devices. Each device 120 may be, for example, an Active Memory Cube (AMC), a Graphics Processing Unit (GPU), or a Field-Programmable Gate Array (FPGA). Each device 120 may include one or more PEs 130, where each PE 130 may be a processor core or a stripped-down version of a processor core with reduced complexity or functionality.

The host processor 110 and the PEs 130 may differ in various ways. For example, an operating system may run on the host processor 110, while the PEs 130 may run accelerated code. The host processor 110 may behave as a control processor, in that it may allocate resources and manage communications between the PEs 130. In some embodiments, the host processor may delegate limited control functionality to one or more PEs, which may then act as supervisor PEs 130, as described below.

The host processor 110 may receive programs for execution by the computer system and may manage the one or more devices and their PEs 130 to execute such programs. After a host processor 110 offloads program execution to a PE 130 of a device 120, there may be a function call that requires computation to be moved from the origin PE 130 (i.e., the PE from which computation is being moved) to a PE 130 in a target device 120 (i.e., the device 120 to which computation is being moved). In the case of a cross-device function call, the target device 120 may be different from the device 120 on which the origin PE 130 resides. The move to another PE 130, herein the "target PE," from the origin PE 130 may be necessitated by, for example, needed data being located on the target device 120 or the target device 120 being better suited to the task than the origin device 120 of the origin PE 130. The dispatch system 100 may facilitate this function call in an efficient manner, without needing to involve the host processor 110.

Figure 2:
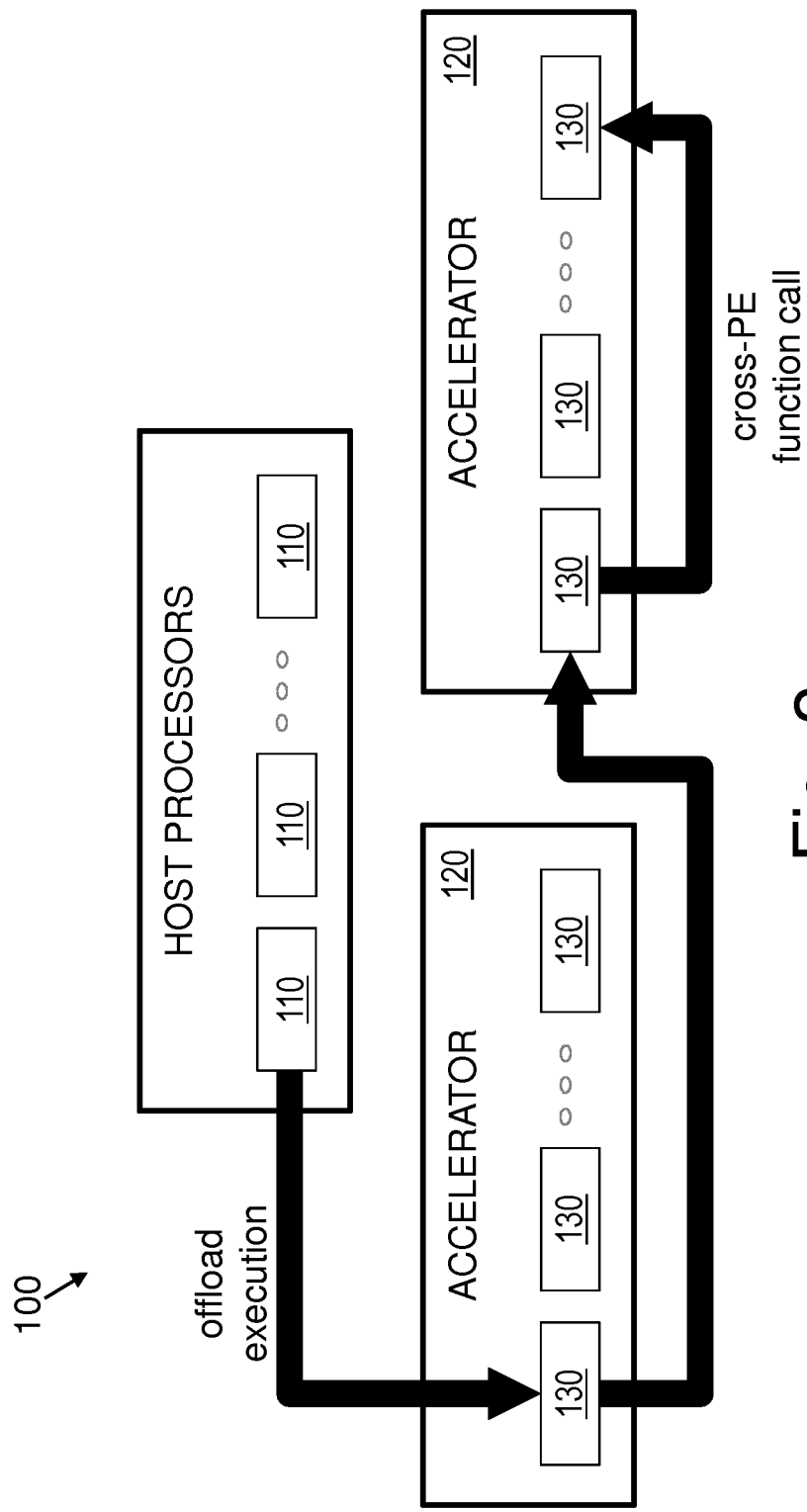
FIG. 2 is a second block diagram of the dispatch system, according to some other embodiments of this disclosure.

FIG. 2 is a second block diagram of the dispatch system 100, according to some embodiments of this disclosure. As shown in FIG. 2, the dispatch system 100 need not be limited to cross-device function calls. Rather, in the case of a cross-PE function call, a computer system may have one or more devices 120, and the target device 120 may be the same as the device 120 on which the origin PE 130 resides. In that case, the dispatch system 100 may facilitate transferring computation to a distinct PE 130 from the origin PE 130 on the same device 120.

Regardless of whether it is a cross-device or a cross-PE function call, when the function call occurs, the origin PE 130 may pass information about the function call to a supervisor PE 130. The supervisor PE 130 may be a host processor 110 or some other PE 130. The information passed may be one or more of, for example, an identifier of the target device 120, a calling context, and an address of the called function. If the PEs 130 operate synchronously, the origin PE 130 may go to sleep after passing along this information, and may awake when the function call returns. If the PEs 130 operate asynchronously, the origin PE 130 may continue execution after passing along this information, and may be notified by the supervisor PE 130 when the function call returns.

The supervisor PE 130 may allocate a target PE 130 on the target device 120, transfer the calling context to that target PE 130, and instruct the target PE 130 to begin execution at the address of the called function. Specifically, to transfer the calling context to the target PE 130, the supervisor PE 130 may copy a current stack frame of the origin PE 130 to a new stack frame on a call stack of the target PE 130. In some embodiments, the origin PE 130 and the target PE 130 may be on different devices 120 and may have distinct memory address spaces. In that case, transferring the context to the target PE 130 may include address translation from the memory address space of the origin PE 130 to the memory address space of the target PE 130. In some embodiments, where the target PE 130 has a different architecture than the origin PE 130, transferring the context to the target PE 130 may include marshalling, which is adjusting data alignment for a different architecture.

When the target PE 130 is finished executing the called function, the supervisor PE 130 may handle the function return as well, by transferring the context back to the origin PE 130. In some embodiments, transferring the context back to the origin PE 130 may include unmarshalling.

Figure 3:
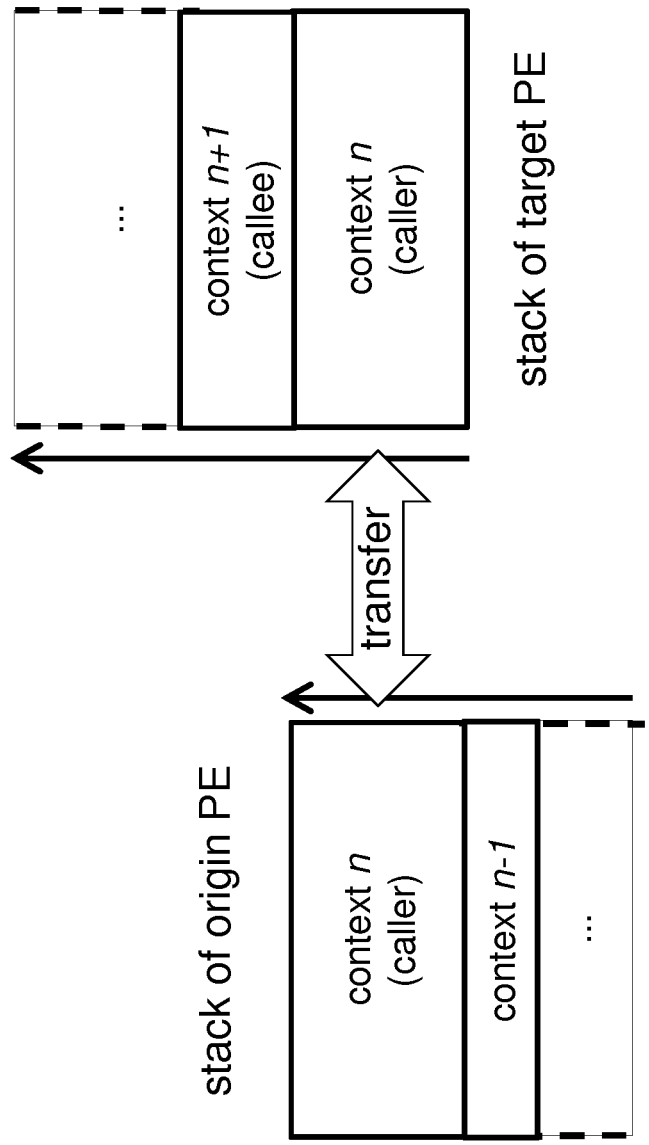
FIG. 3 is a diagram of transferring a program context, according to some embodiments of this disclosure.

FIG. 3 is a diagram of transferring a context as described above, according to some embodiments. As shown, when the function is called, the program's context is transferred to the stack of the target PE 130, and then transferred back after execution of the called function on the target PE 130.

For an example situation in which the present dispatch system 100 may provide an improvement over conventional systems, consider a kernel executing on an AMC or other device 120. In this example, the device 120 has two or more PEs 130, and each PE 130 has its own corresponding PE Instruction Buffer (PIB). Instructions must be loaded into the PIB to be executed by the corresponding PE 130. In this example, the entire kernel is larger than, and thus does not fit in the PIB of a single PE 130 in the device 120. In conventional systems, this can be especially problematic when the kernel's code is enclosed in an iterative loop. For each iteration of the loop, a conventional system would have to load a first part of the code, execute it, load a second part of the code, and execute it. Then, to begin the next iteration of the loop, the conventional system would once again have to load the first part of the code. In other words, the conventional system must repeatedly load and reload these parts of code for each loop, because the entire code cannot fit into the PIB.

In contrast, according to some embodiments, the first part of the code may be loaded into the PIB for an origin PE 130, and that origin PE 130 may make a cross-PE function call to another, target PE 130. The target PE 130 may load the second part of the code into its corresponding PIB. As a result, the iterative loop may then include execution by the origin PE 130 of the first part of the code and execution by the target PE 130 of the second part of the code.

Figure 4:
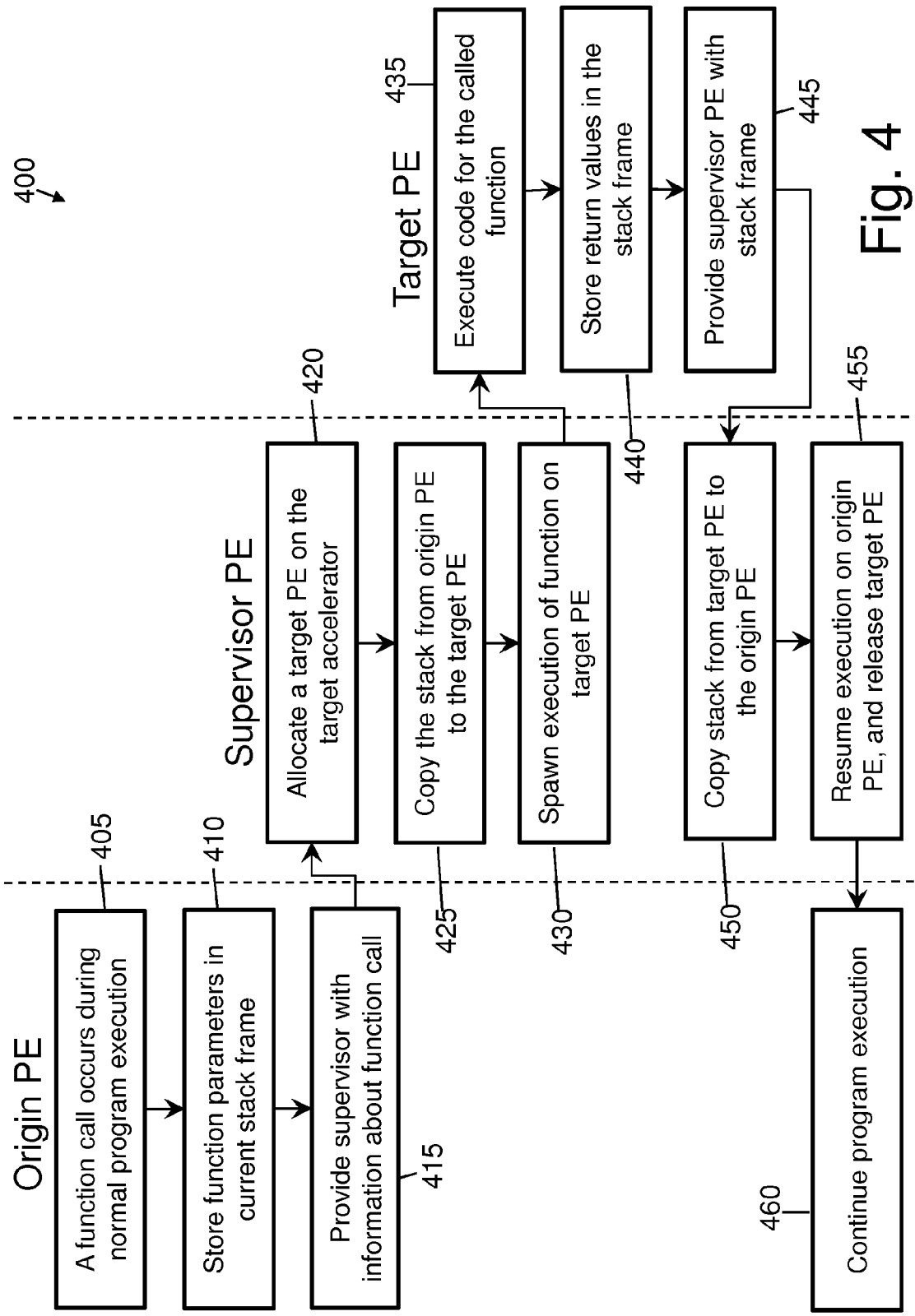
FIG. 4 is a flow diagram of a method for dispatching a function call, according to some embodiments of this disclosure.

FIG. 4 is a flow diagram of a method 400 for dispatching a function call, according to some embodiments of this disclosure. As shown, the method 400 may involve an origin PE 130, a supervisor PE 130, and a target PE 130. It will be understood that the supervisor PE 130 may be distinct from both the origin and target PEs 130 or may be the origin or target PE 130. It will be further understood that the supervisor PE 130 need not be a host processor 110 but, rather, may be a processor on one of the devices 120.

Blocks 405-415 may be performed at the origin PE 130. At block 405, a function may be called during normal program execution at the origin PE 130. At block 410, the origin PE 130 may store in its stack the parameters for the called function. At block 415, the origin PE 130 may send to the supervisor PE 130 information about the call. This information may include an identifier of a target device 120, the current stack frame, and the called function address. If the supervisor PE 130 was asleep, the origin PE 130 may wake the supervisor PE 130 prior to, or in the act of, sending this information.

Blocks 420-430 may be performed at the supervisor PE 130. At block 420, the supervisor PE 130 may allocate a target PE 130 on the target device 120 specified by the origin PE 130. It will be understood that the target device 120 may or may not be the same device 120 on which the origin PE 130 resides. At block 425, the supervisor PE 130 may copy the stack frame to the stack frame of the target PE 130. The supervisor PE 130 may then spawn processing of the called function at the target PE 130, which may include providing to the target PE 130 the address of the called function. This spawning may include, for example, instructing the target PE 130 to execute the called function.

Blocks 435-445 may be performed at the target PE 130. At block 435, the target PE 130 may execute the called function at the address specified. At block 440, the target PE 130 may store any return values of the called function in its stack frame. At block 445, the target PE 130 may provide the supervisor PE 130 with its stack frame. If needed, the target PE 130 may wake the supervisor PE 130 to provide this information.

Blocks 450-455 may be performed at the supervisor PE 130. At block 450, the supervisor PE 130 may copy the stack frame of the target PE 130 to the origin PE 130. At block 455, the supervisor PE 130 may resume execution of the program on the origin PE 130, and may also release the target PE 130. This resuming may include, for example, instructing the origin PE 130 to resume execution of the program.

At block 460, the origin PE 130 may continue program execution after return of the called function.

Figure 5:
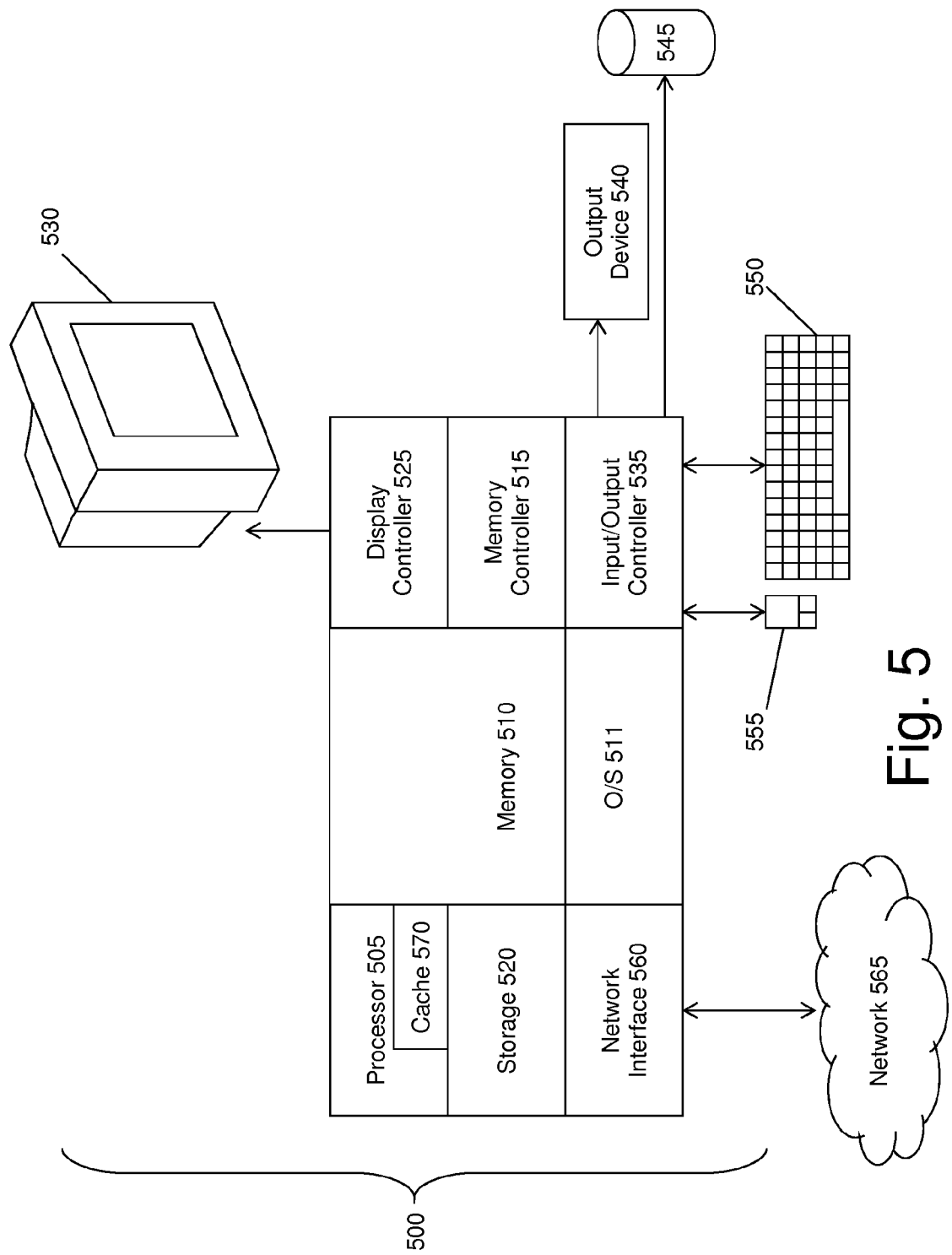
FIG. 5 is a block diagram of a computing device for implementing some or all aspects of the dispatch system, according to some embodiments of this disclosure.

FIG. 5 illustrates a block diagram of a computer system 500 for use in implementing a dispatch system or method according to some embodiments. The dispatch systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Dispatch systems and methods according to this disclosure may be embodied, in whole or in part, in computer program products or in computer systems 500, such as that illustrated in FIG. 5.

Technical effects and benefits of some embodiments include the ability to make function calls across processing elements 130, and even across devices 120, without having to return control to a host processor 110. As a result, some embodiments of the dispatch system 100 may avoid performance degradation and code complexity that exists due to returning control to host processors in conventional systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dispatching a function call, the method comprising:
    making, by an origin processing element (PE) of an origin device, during execution of a program by the origin device, a function call to a function to be performed by a target device other than the origin device;
    storing, by the origin PE, on a stack frame of the origin PE, one or more parameters of the function call;
    receiving, at a supervisor processing element (PE) and from an origin PE, an identifier of the target device, the stack frame of the origin PE, and an address of the function called from the origin PE;
    allocating, by the supervisor PE, a target PE of the target device;
    copying, by the supervisor PE, the stack frame of the origin PE to a new stack frame on a call stack of the target PE, wherein the origin PE and the target PE have distinct memory spaces from each other;
    instructing, by the supervisor PE, the target PE to execute the function at the address;
    receiving, by the supervisor PE, notification from the target PE that execution of the function is complete;
    copying, by the supervisor PE, the new stack frame on the call stack of the target PE to the stack frame of the origin PE;
    releasing, by the supervisor PE, the target PE of the target device; and
    instructing, by the supervisor PE, the origin PE to resume execution of the program.

2. The method of claim 1, wherein the target device is a hardware accelerator, and wherein the origin PE resides on the origin device being a different hardware accelerator than the target device on which the target PE resides.

3. The method of claim 2, wherein the copying the stack frame of the origin PE to the new stack frame on the call stack of the target PE comprises address translation.

4. The method of claim 1, wherein the target device and the origin device on which the origin PE resides have different architectures.

5. The method of claim 4, wherein the copying the stack frame of the origin PE to the new stack frame on the call stack of the target PE comprises marshalling data to comply with an architecture of the target PE.

6. The method of claim 1, wherein the supervisor PE is a PE on a hardware accelerator.

* * * * *